Oct. 26, 1965 H. SCHMID 3,214,514
TELEVISION EFFECTS CONTROL
Filed May 11, 1961

INVENTOR.
HANS SCHMID
BY Alfred W. Barber
ATTORNEY

United States Patent Office 3,214,514
Patented Oct. 26, 1965

3,214,514
TELEVISION EFFECTS CONTROL

Hans Schmid, Amityville, N.Y., assignor, by mesne assignments to The Hammarlund Manufacturing Co., Inc., a corporation of New York Filed May 11, 1961, Ser. No. 109,367
3 Claims. (Cl. 178—6)

The present invention concerns television superposition effects generators and, in particular, such generators utilizing a joy stick control.

The accepted current method of providing television pictures consists in scanning a scene or a film line by line to form a single frame and to repeat the frames often enough to follow action and to prevent flicker in the reproduced picture. Between the time at which the picture is picked up at the studio and when it is reproduced on a screen in the home, the picture is represented by electrical signals. It has been found that if two scenes are picked up at the same time, that their signals may be interchanged in blocks of various sizes and shapes to provide inserted pictures on the home screen. For example, scene A may be made to cover the left half of the receiving screen and scene B the right half. This insertion may consist in a simple effect like the one just cited or it may be more complex as, for instance, the screen may show scene A except for the upper right quadrant which may show scene B. One form which is particularly significant with respect to the present invention shows scene A over the major portion of the screen with scene B inserted in a circular area and to make the system useful and interesting means are provided for moving this circular area about at will. The present invention concerns a new and novel means for controlling the position of an inserted picture area in a television system. The device of the present invention employs what may be descriptively termed a "joystick" control which is combined with a simulated television screen in such a way that when it is moved to any point in the simulated screen, the effect produced takes place at a corresponding point on the home television screen. The present invention also employs means to permit moving the control arm of the joystick to any point or area of the simulated screen with uniform freedom in contrast to a device which shows a predisposition to move along one of two mutually perpendicular directions.

Accordingly one object of the present invention is to provide a television scene insertion device controlled by a joystick on a simulated television screen.

Another object is to provide a television scene insertion joystick control which has equal freedom in any direction of motion on the simulated screen.

A further object is to provide a joystick control of insertion effects for television which is simple to use, maintains any given setting until moved and has a long, trouble-free life expectancy.

These and other objects of the present invention will be apparent from the detailed description of the invention given in the specification in connection with the various figures of the drawing.

Figure 1:
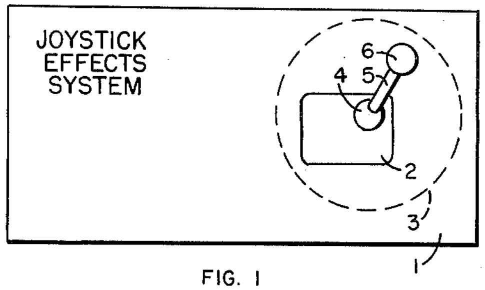
FIGURE 1 is a view of the present invention as it appears to the user.
Figure 2:
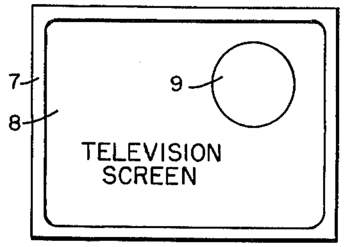
FIGURE 2 is a view of a home television screen showing the effect obtained with the present invention.

FIG. 1 shows a panel 1 which may be taken to represent the insertion control panel used in the present invention and would also contain various controls not essential to the present invention and hence not shown. The essential elements of the present invention visible from the operator's position include the simulated television picture screen 2 having a standard aspect ratio, indicator ball bearing having the size and position of the inserted area, arm 5 and handle grip 6 although it will be understood that the control may be used for other shapes and sizes of insertions. The dotted area 3 indicates the approximate area and position of the flat bearing behind the panel to be described more fully below. In operation indicator 4 is moved to the point or area on the simulated television screen 2 at which the insertion of pictures is desired and the receiver screen shows the inserted picture in this same area as shown in FIG. 2, where inserted area 9 on television screen 8 of television receiver 7 occupies a position corresponding to that of the indicator 4 on screen 2 of FIG. 1.

Figure 3:
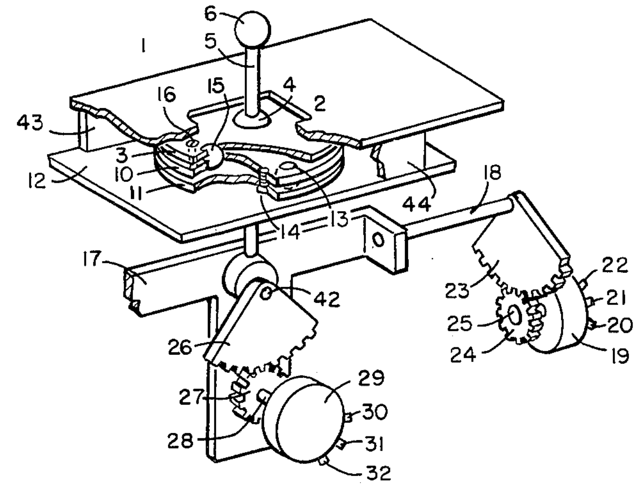
FIGURE 3 is a mechanical drawing of one form of the present invention.

FIG. 3 shows the mechanical details of a scene insertion control system constructed in accordance with the present invention. Essentially the control effect is generated from two potentiometers which represent the horizontal and vertical coordinates of the center of the insertion area. These potentiometers are coupled to the joystick handle so that they are varied simultaneously, one in proportion to the horizontal distance traversed and the other in proportion to the vertical distance traversed to establish the center of the insertion area. The control rod 5 passes through the indicator ball 4 in a sliding relationship to a gimbal having two perpendicular axes, one axis 42 permitting lateral turning and the other axis 18 permitting vertical motion. Shaft 5 continues directly or is rigidly connected to gear sector 26 meshed with spur gear 27 carried by shaft 28 of horizontal control potentiometer 29 having terminals 30–31–32. This arrangement will obviously cause the shaft 28 of potentiometer 29 to rotate in proportion to the horizontal displacement of arm 5 and also indicator ball 4 coupled to or carried by it. Since shaft 5 passes through with a close fit or is otherwise coupled to frame 17, vertical displacement of arm 5 and indicator ball 4 will cause frame 17 to rotate along with axis 18. Axis 18 is mechanically attached to gear sector 23 which is meshed with spur gear 24 connected to control shaft 25 of potentiometer 19 having terminals 20–21–22. Thus any vertical displacement of arm 5 and indicator ball 4 will be transmitted to potentiometer shaft 25 thereby varying the setting of potentiometer 19 in accordance with the vertical displacement of arm 5 and indicator ball 4. It will be seen that the center of motion of shaft 5 is the projected intersection between the centers of axis 18 and axis 42 and that since indicator ball 4 always moves in the plane of the simulated screen 2, that shaft 5 must slide in ball 4 and that ball 4 must be free to rotate.

The position of ball 4 in a plane is determined by captivating it by means of the three discs 3, 10 and 11. These discs are cut out to receive ball 4 but the holes in discs 3 and 11 must be smaller than the maximum diameter of ball 4 in order to keep it captive. These three discs serve several functions. The center disc 10 may preferably be of metal to form a bearing surface and to hold screws to be described below. Discs 3 and 11 may preferably be of some tough light colored plastic such as Teflon since they serve several functions. The whole assembly of discs and ball bearings, to be described, serves as a "flat bearing" between the front panel 1 and a rear plate 12 spaced from panel 1 by a fixed amount as determined by fixed spacers 43 and 44. The metal center plate 10 acts as an intermediate bearing while plate 3 on one side retains balls 15 which are spring pressed toward panel 1 by retaining screws 16 and plate 11 while plate 11 retains balls 13 pressed against rear plate 12 by spring pressure from plate 3 held to center plate 10 by retaining screws 14. Thus the flat bearing effect of the disc and ball assembly is spring loaded to supply a certain amount of friction while allowing equally free motion in any direction. This predetermined friction is made great enough to mask the two directional loading of potentiometers 19 and 29 so that the operator of this joystick control may move it in any way without being influenced by any preferred directional loading due to the control potentiometers. The simulated television screen as shown at 2 of FIG. 1 is created by a cut-out in panel 1 so that the front surface of plastic disc 3 shows over the opening. The color of the plastic should contrast with the color of the panel to provide the desired simulation of the television screen.

Figure 4:
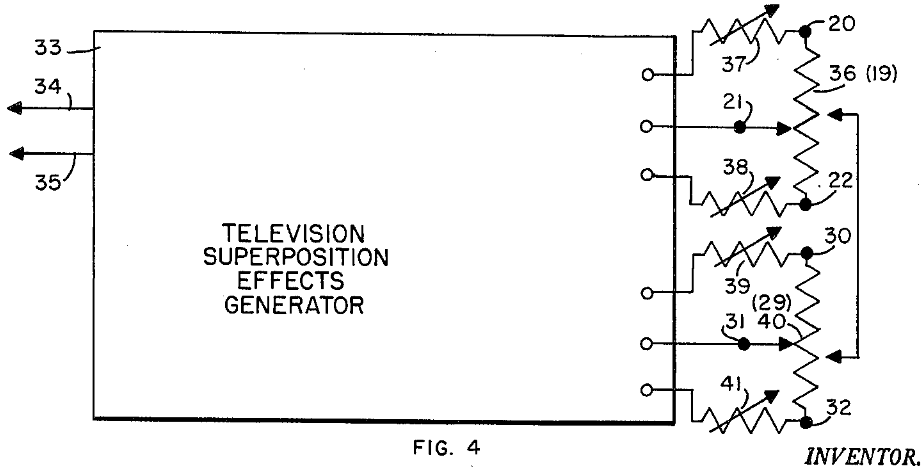
FIGURE 4 is a schematic and block diagram of the essential circuit of the present invention.

FIG. 4 shows how the potentiometers 36 (19) and 40 (29) are connected to a television superposition effects generator 33 having output leads 34 and 35 for applying the effects to a television program. Such a superposition, or insertion, effects generator may consist of a Model 490WA1 Waveform Generator and a Model 490SA1 Switching Amplifier manufactured by the Telechrome Manufacturing Corporation of Amityville, New York. As described in Broadcast Engineering Magazine for February of 1961, the Waveform Generator generates keying signals for 72 different "wipes," which signals are selectively applied to the Switching Amplifier. This amplifier combines two picture signals in accordance with the applied keying waveform. The insertion effects generator is controlled by the vertical and horizontal potentiometers 19 and 29. Between terminals 20, 22, 30 and 32 of the control potentiometers are connected calibrating variable resistors 37, 38, 39 and 41 respectively to provide means for adjusting the system so that the superposition area on the television receiving screen corresponds faithfully with the position of indicator ball 4 on the simulated screen. If the indicator ball 4 is of a size and shape which bears the same relationship to the simulated screen as the final effect does to the television receiving screen a very realistic control device is provided.

While only one embodiment of the present invention has been shown and described many modifications will be apparent to those skilled in the art and within the spirit and scope of the invention as set forth in particular in the appended claims.

What is claimed is:

1. A television picture scene insertion control system for controlling the position of an inserted picture area in a television system comprising:

a front panel including a cutout portion simulating a television picture screen;

bearing means mounted behind said front panel;

indicator means mounted in said bearing means for movement only in the plane of said front panel and within the boundaries of said cutout portion;

a control rod extending through said front panel cutout portion, said bearing means and said indicator means;

horizontal scene insertion control means having an adjustable setting;

vertical scene insertion control means having an adjustable setting;

gimbal means coupling said control rod to said horizontal and said vertical insertion control means, whereby movement of said control rod moves said indicator means in the plane of said front panel and proportionally adjusts said insertion control means to settings corresponding to the position of said indicator means.

2. The system of claim 1, wherein said bearing means includes three parallel discs movable with respect to one another in planes parallel to said front panel, said indicator means comprising an indicator ball carried by said discs and through which said control rod extends, whereby said indicator ball is movable in the plane of said front panel.

3. The system of claim 2, wherein said horizontal and said vertical insertion control means are potentiometers.

References Cited by the Examiner

UNITED STATES PATENTS

| | | | |
|---|---|---|---|
| 2,098,390 | 11/37 | Iams | 178—7.5 |
| 2,244,251 | 6/41 | Goldsmith | 178—7.5 |
| 2,510,670 | 6/50 | Trott | 178—7.5 |
| 2,516,069 | 7/50 | Newhouse | 178—6.8 |
| 3,057,953 | 10/62 | Guerth | 178—6 |

DAVID G. REDINBAUGH, *Primary Examiner.*

ELI J. SAX, *Examiner.*